UNITED STATES PATENT OFFICE.

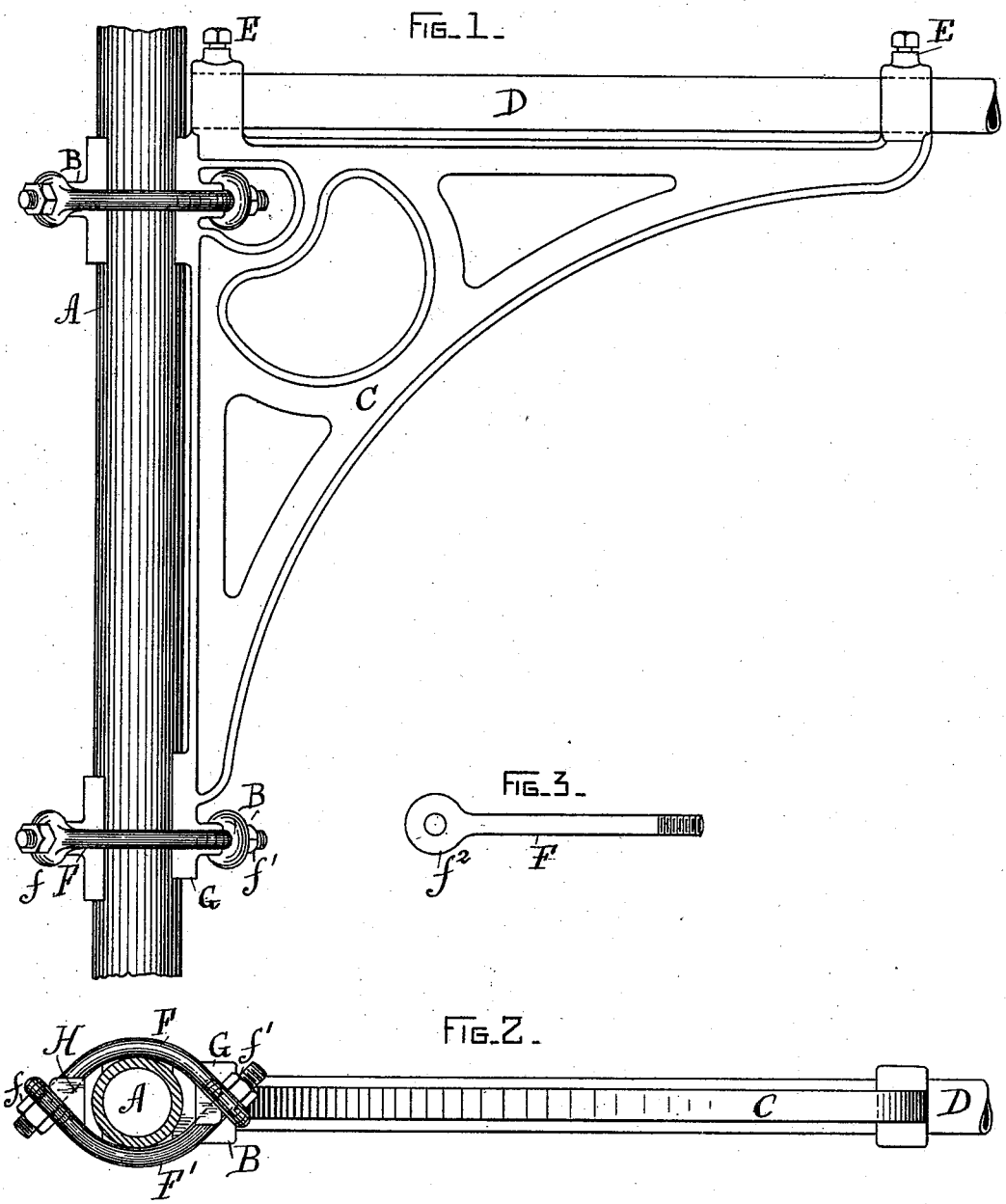

AUGUSTUS A. BALL, JR., OF SCHENECTADY, NEW YORK, ASSIGNOR TO THE THOMSON-HOUSTON ELECTRIC COMPANY, OF BOSTON, MASSACHUSETTS.

BRACKET-CLAMP.

SPECIFICATION forming part of Letters Patent No. 532,748, dated January 22, 1895.

Application filed October 18, 1894. Serial No. 526,255. (No model.)

*To all whom it may concern:*

Be it known that I, AUGUSTUS A. BALL, Jr., a citizen of the United States, residing at Schenectady, in the county of Schenectady, State of New York, have invented certain new and useful Improvements in Bracket-Clamps, of which the following is a specification.

My invention relates to clamps for the bracket arms upon the poles of electric overhead structures of any kind, whether designed for electric lights or railway work; and has particular reference to the means for securing the bracket arm to the pole. Its object is to provide a cheap and simple means of doing this, which may be readily applied by inexperienced labor and will permit the ready adjustment of the bracket at any height desired. This I accomplish by taking two eye-bolts and curving them to a shape somewhat like that of the pole, then threading the tail of each bolt through the eye of the other, and then applying nuts to the ends of the bolts projecting through the eyes. When the two bolts are thus applied around the pole and the nuts screwed up they grip the pole very firmly and are held securely in place upon it.

The accompanying drawings show an embodiment of my invention.

Figure 1 is a side elevation of a pole and bracket secured together by my improved scheme; Fig. 2, a plan view of the parts shown in Fig. 1 inverted, and Fig. 3 a separate detail showing the form of bolt preferred.

A is the pole. B, B are the clamps. C is the bracket secured to the pole. D is a rod held in place on the bracket by the set screws E, E. Except the clamps the parts are all old and well known.

Referring now to Fig. 2, the construction of the clamp is more clearly illustrated, the pole being shown in section. Therein F, F' are eye-bolts of substantially the form shown in Fig. 3. I prefer, although it is not essential, to use an upset bolt, so as to avoid welding the eye, but a bolt of ordinary round stock with the eye bent into shape may be used with good effect, if desired.

Fig. 3 shows a bolt of the form preferred, F being the body of the bolt and $f^2$ being the upset eye, as described.

The bolts are provided, as usual, with threaded ends, and with nuts $f, f'$. On the bottom of the bracket is a lug G having a curved inner seat abutting against the pole, this seat being of approximately the curvature of the pole. A similar washer or lug H is provided, which is inserted between the other ends of the bolts F, F' and the pole upon the opposite side from the bracket. The same arrangement is used at the top of the bracket.

The use and application of my improved clamp will be readily understood from the foregoing description.

What I claim as new, and desire to secure by Letters Patent of the United States, is—

1. The improved clamp for securing brackets to the poles in electric overhead constructions, consisting of bolts each having its threaded end passed through the eye of the other, and washers adapted to partially conform to the shape of the pole.

2. In combination, a pole, washers adapted to partially conform to the shape thereof, a bracket or other part to be secured to the pole, and bolts embracing the pole, the washers and the bracket, each bolt having its threaded end passed through the eye of the other, and nuts securing the parts in place, substantially as described.

In witness whereof I have hereunto set my hand this 10th day of October, 1894.

AUGUSTUS A. BALL, JR.

Witnesses:
B. B. HULL,
GENEVIEVE HAYNES.